(12) United States Patent
Schmidt et al.

(10) Patent No.: US 12,351,499 B2
(45) Date of Patent: Jul. 8, 2025

(54) WATER TREATMENT SYSTEM (71) Applicant: Praqua Pty Ltd, Angaston (AU)

(72) Inventors: Simon Karl Schmidt, Evandale (AU); Joshua Leigh Schmidt, Angaston (AU)

(*) Notice: Subject to any disclaimer, the term of this patent is extended or adjusted under 35 U.S.C. 154(b) by 606 days.

(21) Appl. No.: 17/633,861

(22) PCT Filed: Aug. 7, 2020

(86) PCT No.: PCT/AU2020/050817
§ 371 (c)(1),
(2) Date: Feb. 8, 2022

(87) PCT Pub. No.: WO2021/022339
PCT Pub. Date: Feb. 11, 2021

(65) Prior Publication Data
US 2022/0396513 A1 Dec. 15, 2022

(30) Foreign Application Priority Data
Aug. 8, 2019 (AU) .................. 2019902838

(51) Int. Cl.
| C02F 9/20 | (2023.01) |
| C02F 1/00 | (2023.01) |
| C02F 1/28 | (2023.01) |
| C02F 1/52 | (2023.01) |
| C02F 1/68 | (2023.01) |
| C02F 1/76 | (2023.01) |

(52) U.S. Cl.
CPC ........... *C02F 9/20* (2023.01); *C02F 1/002* (2013.01); *C02F 1/283* (2013.01); *C02F 1/5245* (2013.01); *C02F 1/68* (2013.01); *C02F 1/76* (2013.01); *C02F 2303/04* (2013.01); *C02F 2307/10* (2013.01)

(58) Field of Classification Search
CPC .. C02F 9/20; C02F 1/002; C02F 1/283; C02F 1/5245; C02F 1/68; C02F 1/76; C02F 2303/04; C02F 2307/10; C02F 1/52; C02F 1/72
USPC ........................................... 210/721
See application file for complete search history.

(56) References Cited

U.S. PATENT DOCUMENTS

| 4,776,963 A | 10/1988 | Inagaki et al. |
| 2010/0025339 A1 | 2/2010 | Lundquist et al. |
| 2013/0319927 A1 | 12/2013 | Lin |

*Primary Examiner* — Ekandra S. Miller-Cruz
(74) *Attorney, Agent, or Firm* — Klarquist Sparkman, LLP (57) ABSTRACT

The present disclosure relates to a water treatment system, methods for treating water, and products for treating water. In certain embodiments, the present disclosure provides a water treatment system, the system comprising: (i) a chemical disinfectant and a flocculating agent, to treat water; and (ii) a deformable container comprising: an opening to receive water for treatment into the container; an internal storage region for holding an amount of water; a partitionable region fluidly partitionable from the internal storage region for separating the flocculating agent upon settling after exposure to water in the container; and an outlet in fluid connection with the internal storage region to remove water from the container.

14 Claims, 5 Drawing Sheets

WATER TREATMENT SYSTEM

PRIORITY CLAIM

This application is the § 371 U.S. National Stage of International Application No. PCT/AU2020/050817, filed Aug. 7, 2020, which was published in English under PCT Article 21(2), which in turn claims priority to Australian Provisional Patent Application 2019902838 filed on 8 Aug. 2019, the contents of which is hereby incorporated by reference.

FIELD

The present disclosure relates to a water treatment system, methods for treating water, the use of a water treatment system to treat water, and products for treating water.

BACKGROUND

There are a variety of situations where access to non-contaminated water becomes difficult. Such situations often arise after natural emergencies have compromised infrastructure to deliver treater water to the population. Continued access to non-contaminated water is important to ensure the health of people affected by such situations.

Many natural water sources contain some form of pathogens that present a risk to health, particularly for the young, the elderly or those with compromised immune systems. Further contamination may also result after natural emergencies occur. In addition, aside from biological pathogens, some water sources also contain suspended matter, typically soils, mud and organic matter, which can also present a health risk and/or impart an unpleasant taste or smell to the water.

Aside from emergency situations, there are also other situations such as recreational camping where clean water is not readily available and access to water for drinking, cleaning and/or washing would be desirable.

Boiling of water is a recognised means for destroying pathogens, however this process is best suited for small amounts of water and does not deal with any suspended matter present in the original water source. A variety of filtration systems are also available, but these are typically relatively expensive, variable in their ability to remove or destroy pathogens, best suited for small amounts of water and/or may have a defined useable lifespan before replacement of the filters.

Accordingly, there is a need for improved and/or more cost effective systems for water treatment.

SUMMARY

The present disclosure relates to a water treatment system, methods for treating water, the use of a water treatment system to treat water, and products for treating water.

Certain embodiments of the present disclosure provide a water treatment system, the system comprising:
(i) a chemical disinfectant and a flocculating agent, to treat water; and
(ii) a deformable container comprising:
an opening to receive water for treatment into the container;
an internal storage region for holding an amount of water;
a partitionable region fluidly partitionable from the internal storage region for separating settled flocculant resulting from exposure of the flocculating agent to water in the container; and
an outlet in fluid connection with the internal storage region to remove water from the container.

Certain embodiments of the present disclosure provide a method of treating water, the method comprising using a water treatment system as described herein.

Certain embodiments of the present disclosure provide a method of producing potable water, the method comprising using a water treatment system as described herein to produce the potable water.

Certain embodiments of the present disclosure provide a water treatment product comprising the following components:
(i) a chemical disinfectant to treat water;
(ii) a flocculating agent; and
(iii) a deformable container comprising;
an opening to receive water for treatment into the container;
an internal storage region for holding an amount of water;
a partitionable region fluidly partitionable from the internal storage region for separating settled flocculant resulting from exposure of the flocculating agent to water in the container; and
an outlet in fluid connection with the internal storage region to remove water from the container.

Certain embodiments of the present disclosure provide a deformable water container for treatment of water, the water container comprising:
an opening to receive water for treatment into the container;
an internal storage region for holding an amount of water;
a partitionable region fluidly partitionable from the internal storage region for separating settled flocculant resulting from exposure of a flocculating agent to water in the container; and
an outlet in fluid connection with the internal storage region to remove water from the container.

Certain embodiments of the present disclosure provide a method of treating water, the method comprising using a chemical disinfectant and a flocculating agent to treat water in a water container as described herein.

Certain embodiments of the present disclosure provide a method of treating water, the method comprising:
(i) collecting water for treatment in a deformable water container comprising:
an opening to receive water for treatment into the container;
an internal storage region for holding an amount of water;
a partitionable region fluidly partitionable from the internal storage region; and
an outlet in fluid connection with the internal storage region to remove water from the container;
(ii) exposing the water in the container to a chemical disinfectant and a flocculating agent;
(iii) allowing the flocculating agent to form a flocculant and settle in the partitionable region; and
(iv) separating the flocculant in the partitionable region from the water in the internal storage region;
thereby treating the water.

Certain embodiments of the present disclosure provide a method of producing potable water, the method comprising:
(i) collecting water for treatment in a deformable water container comprising:
an opening to receive water for treatment into the container;
an internal storage region for holding an amount of water;

a partitionable region fluidly partitionable from the internal storage region; and an outlet in fluid connection with the internal storage region to remove water from the container;

(ii) exposing the water in the container to a chemical disinfectant and a flocculating agent;

(iii) allowing the flocculating agent to form a flocculant and settle in the partitionable region;

(iv) separating the flocculant in the partitionable region from the internal storage region; and (v) collecting the water from the outlet;

thereby producing potable water.

Other embodiments are described herein.

BRIEF DESCRIPTION OF THE FIGURES

Certain embodiments are illustrated by the following figures. It is to be understood that the following description is for the purpose of describing particular embodiments only and is not intended to be limiting with respect to the description.

DETAILED DESCRIPTION

The present disclosure relates to a water treatment system, methods of treating water, the use of a water treatment system to treat water, and products for treating water.

Certain embodiments of the present disclosure provide a water treatment system.

In certain embodiments, the present disclosure provides a water treatment system, the system comprising:

(i) a chemical disinfectant and a flocculating agent, to treat water; and (ii) a deformable container comprising:

an opening to receive water for treatment into the container;

an internal storage region for holding an amount of water;

a partitionable region fluidly partitionable from the internal storage region for separating settled flocculant resulting from exposure of the flocculating agent to water in the container; and an outlet in fluid connection with the internal storage region to remove water from the container.

In certain embodiments, the water treatment system is portable. In certain embodiments, the water treatment is suitable for treating at least 10 litres of water, although treatment of other volumes of water by the system is contemplated.

The term "deformable container" as used herein refers to a container made from one or more materials that allow the container to be deformable to an extent that the container is able to compressed, twisted or otherwise manipulated, so as to prevent fluid connection between different parts of the container and thereby quarantine water in the partitionable region from the water in the internal storage region to be used.

In certain embodiments, the water treatment system is used to treat water for one or more of drinking, cooking, washing or cleaning. Other uses are contemplated. The term "treat" and variations thereof as used herein refers to an action on water to disinfect, sterilize, cleanse, depollute, clarify, deodorise, decolourise and/or oxidise the water. In this regard, it will be appreciated that these actions to treat the water may be partial or complete, and that the treatment of the water results in an improvement in one or more characteristics of the water such as quality, pathogen load, taste, colour and/or smell of the water.

In certain embodiments, the water treatment system treats water in a period of time of 1 hour or less, although other times are contemplated depending on the amount of water to be treated, its purity and the type of chemical disinfectant and flocculating agent selected. In certain embodiments, the water is treated in a period of about 30 minutes. A suitable period of time may be selected based on the initial characteristics of the water to be treated and the outcome of treatment required.

In certain embodiments, the chemical disinfectant comprises a chlorine based disinfectant. In certain embodiments, the chemical disinfectant comprises a hypochlorite, such as a hypochlorite salt. Other types of chemical disinfectants are contemplated, such as hydrogen peroxide, bromine, iodine, copper based disinfectants, oxidants and silver based disinfectants. A suitable amount of the chemical disinfectant may be selected based on the initial characteristics of the water to be treated and the outcome of treatment required.

In certain embodiments, the chemical disinfectant comprises calcium hypochlorite.

Example of flocculants include alum, aluminium chlorohydrate, aluminium sulphate, calcium oxide, calcium hydroxide, iron(II) sulphate (ferrous sulphate), iron(III) chloride (ferric chloride), polyacrylamide, polyDADMAC, sodium aluminate, and sodium silicate. Other types of flocculants are contemplated. A suitable amount of the flocculating agent may be selected based on the initial characteristics of the water to be treated and the outcome of treatment required.

In certain embodiments, the flocculating agent comprises a ferric salt. In certain embodiments, the flocculating agent comprises a ferric sulphate.

In certain embodiments, the chemical disinfectant comprises calcium hypochlorite and the flocculating agent comprises ferric sulphate.

The chemical disinfectant may be provided in a suitable form, such as a solid, a powder or a solution. The flocculating agent may also be provided in a suitable form, such as a solid, a powder or a solution. Other forms of the chemical disinfectant and the flocculating agent are contemplated.

In certain embodiments, the chemical disinfectant and the flocculating agent are provided separately. In certain embodiments, the chemical disinfectant and the flocculating agent are provided in a combined form, for example as a mixture.

For example, the chemical disinfectant and the flocculating agent may be provided in a solid form, such as a powdered mix of the two agents. The P&G Purifier of Water product available from Proctor & Gamble provides a powdered mixture of the chemical disinfectant and the flocculating agent in a 4 gram sachet suitable for treating 10 litres of water.

In certain embodiments, the container comprises a capacity of at least 10 litres. In certain embodiments, the container comprises a capacity of about 10 litres of water.

The term "partitionable region" as used herein refers to a part of the container that is able to be fluidly sealed or separated from the rest of the container. In certain embodiments, the partitionable region comprises a separate region or compartment in fluid connection with the rest of the container.

In certain embodiments, the partitionable region comprises a capacity of at least 0.5 litres.

In certain embodiments, the partitionable region is fluidly partitionable from the internal storage region by twisting. In certain embodiments, the partitionable region is fluidly partitionable from the internal storage region by tying or clamping. Other methods for partitioning are contemplated. In these embodiments, it will be appreciated that the container is made from a material that permits partitioning by these methods.

It will be appreciated that in certain embodiments, the water treatment system utilises the force of gravity to assist with the flocculated material moving into the partitionable region. In other embodiments, centrifugal force may be applied (for example by spinning the container in a circular pattern) to assist with the flocculated material moving into the partitionable region.

In certain embodiments, the container comprises a means for partitioning the partitionable region from the internal storage region. In certain embodiments, the means for partitioning comprises a locking slider or a snaplock seal. For example, the container may have a snaplock seal formed integrally with the container.

In certain embodiments, the water treatment system comprises a means for partitioning the partitionable region from the internal storage region. In certain embodiments, the water treatment system comprises a clamp or tie. For example, a product for treating water may be sold with a container as described herein and a separate clamp for sealing the partitionable region.

In certain embodiments, the opening is located in the partitionable region. In certain embodiments, the opening is located near the base of the partitionable region. In certain embodiments, the opening is located at the base of the partitionable region.

In certain embodiments, the opening comprises an aperture of a diameter of greater than 10 cm. In certain embodiments, the opening comprises an aperture of a diameter in the range from 10 cm to 15 cm. Other sizes are contemplated.

In certain embodiments, the opening is adapted to be closable so as to seal the opening. In certain embodiments, the opening is adapted to be closable with a locking slider or seal.

In certain embodiments, the container comprises a means for closing the opening. In certain embodiments, the means for closing comprises a locking slider, a snaplock seal, a clamp or a tie. For example, the container may have a snaplock seal formed integrally with the container at the opening.

In certain embodiments, the water treatment system comprises a means for closing the opening. In certain embodiments, the water treatment system comprises a locking slider, a clamp or a tie. For example, a product for treating water may be sold with a container as described herein and a separate locking slider.

In certain embodiments, the water treatment system comprises a locking slider or seal in order to seal the opening. In certain embodiments, the container comprises a locking seal or slider In certain embodiments, the opening is adapted to be re-openable to allow evacuation of waste material from the partitionable region.

In certain embodiments, the container comprises a tapering region adjacent to the partitionable region. The use of a tapering region assists with settling and/or concentrating of the flocculant in the partitionable region, as the tapering walls provide a transitional area where flocculant is less likely to collect or be caught on the walls of the container.

In certain embodiments, the outlet is located above the tapering region. This configuration of the outlet reduces the likelihood of any settled flocculant being near the outlet. Other locations of the outlet are contemplated.

In certain embodiments, the outlet is closable. For example, the outlet may comprise a lid, a cap, a tap, a closable valve, or a spigot. In certain embodiments, the closable outlet comprises a tap or spigot.

In certain embodiments, the outlet comprises one or more filters, to assist with straining and/or further purifying the water in the container prior to use. In certain embodiments, the one or more filters are replaceable.

In certain embodiments, the one or more filters comprise a size exclusion filter. Size exclusion filters are known in the art. For example, a mesh to exclude particles of a size greater than 0.2 microns may be used.

In certain embodiments, the one or more filters comprise an activated carbon filter. Activated carbon filters are known in the art.

In certain embodiments, the outlet comprises a size exclusion filter in line with an activated carbon filter.

In certain embodiments, the container comprises a means for hanging or holding the container in an upright position to allow settling of the flocculating agent in the partitionable region under the action of gravity. In certain embodiments, the container comprises a handle.

The container may be made from a suitable material.

In certain embodiments, the container is translucent or transparent. The use of a translucent or transparent container assists with visualisation of the settling of the flocculant and/or the action of clarifying the water.

In certain embodiments, the container is formed from a flexible plastic polymer. Examples of flexible plastic polymers are known in the art, such as HDPE, nylon and polyester. Methods for manufacturing using such polymers are known in the art.

In certain embodiments, the container comprises one or more further closable inlet/outlets. This allows introduction of other agents into the container before and/or after treatment. Such agents include, for example, one or more of specific chemical agents for further treating the water, flavourants, colourants, clarifiers, vitamins, minerals, therapeutic agents (such as antibiotics), and vaccines.

In certain embodiments, the container comprises one or more further closable inlet/outlets located above the outlet.

In certain embodiment, the water treatment system comprises evacuating the flocculant from the partitionable region via the closable opening, and collecting the treated water from the outlet.

Certain embodiments of the present disclosure provide a method of treating water using a water treatment system as described herein to treat the water.

Certain embodiments of the present disclosure provide a method of producing potable water using a water treatment system as described herein to produce the potable water.

Certain embodiments of the present disclosure provide a method of treating water, the method comprising:
  (i) collecting water for treatment in a deformable water container comprising:
    an opening to receive water for treatment into the container;
    an internal storage region for holding an amount of water;
    a partitionable region fluidly partitionable from the internal storage region; and
    an outlet in fluid connection with the internal storage region to remove water from the container;
  (ii) exposing the water in the container to a chemical disinfectant and a flocculating agent;
  (iii) allowing the flocculating agent to form a flocculant and settle in the partitionable region; and
  (iv) separating the flocculant in the partitionable region from the water in the internal storage region;
  thereby treating the water.

Certain embodiments of the present disclosure provides a method of producing potable water, the method comprising:
  (i) collecting water for treatment in a deformable water container comprising:
    an opening to receive water for treatment into the container;
    an internal storage region for holding an amount of water;
    a partitionable region fluidly partitionable from the internal storage region; and
    an outlet in fluid connection with the internal storage region to remove water from the container;
  (ii) exposing the water in the container to a chemical disinfectant and a flocculating agent;
  (iii) allowing the flocculating agent to form a flocculant and settle in the partitionable region;
  (iv) separating the flocculant in the partitionable region from the internal storage region; and
  (v) collecting water from the outlet
  thereby producing potable water.

Certain embodiments of the present disclosure provide a water treatment product.

In certain embodiments, the present disclosure provides a water treatment product comprising the following components:
  (i) a chemical disinfectant to treat water;
  (ii) a flocculating agent; and
  (iii) a deformable container comprising:
    an opening to receive water for treatment into the container;
    an internal storage region for holding an amount of water;
    a partitionable region fluidly partitionable from the internal storage region for separating the flocculating material resulting from exposure of the flocculating agent to water in the container; and
    an outlet in fluid connection with the internal storage region to remove water from the container.

Chemical disinfectants and flocculating agents are described herein. In certain embodiments, the chemical disinfectant and flocculating agent are combined in a mixture. In certain embodiments, the chemical disinfectant and flocculating agent are combined in a mixture in an amount to treat the amount of water able to be held by the container. In certain embodiments, the chemical disinfectant and flocculating agent are provided in a sachet.

In certain embodiments, the product comprises one or more of clamps, ties, locking sliders and seals. Means for sealing are described herein.

In certain embodiments, the product comprises one or more filters for use in the outlet. Filters are described herein.

In certain embodiments, the water treatment product comprises one of more of vitamins, minerals, flavours, antibiotics, therapeutic agents or vaccines. Such agents may be provided in a suitable form for introduction into the container before and/or after treating water.

In certain embodiments, the product further comprises instructions to treat water using the product.

Certain embodiments of the present disclosure provide a deformable water container for treatment of water.

In certain embodiments, the present disclosure provides deformable water container for treatment of water, the water container comprising:
  an opening to receive water for treatment into the container;
  an internal storage region for holding an amount of water;
  a partitionable region fluidly partitionable from the internal storage region for separating settled flocculant resulting from exposure to water in the container; and
  an outlet in fluid connection with the internal storage region to remove water from the container.

Containers, and their various components, are as described herein.

In certain embodiments, the partitionable region is fluidly partitionable from the internal storage region by twisting.

In certain embodiments, the partitionable region is fluidly partitionable from the internal storage region by tying or clamping.

In certain embodiments, the container comprises a means for partitioning the partitionable region from the internal storage region. In certain embodiments, the means for partitioning comprises a locking slider or seal.

In certain embodiments, the opening is located in the partitionable region. In certain embodiments the opening is located at the base of the partitionable region.

In certain embodiments, the container comprises a tapering region adjacent to the partitionable region.

In certain embodiments, the outlet is located above the tapering region.

In certain embodiments, the outlet comprises one or more filters. In certain embodiments, the one or more filters comprise a size exclusion filter and/or an activated carbon filter.

In certain embodiments, the outlet comprises a tap or spigot.

In certain embodiments, the container comprises a means for hanging or holding the container in an upright position to permit settling of the flocculating agent in the partitionable region under the action of gravity.

In certain embodiments, the container is translucent or transparent.

In certain embodiments, the container is formed from a flexible polymer.

Certain embodiments of the present provide a method of treating water, the method comprising using a chemical disinfectant and a flocculating agent to treat water in a water container as described herein.

The present disclosure is further described by the following examples. It is to be understood that the following description is for the purpose of describing particular embodiments only and is not intended to be limiting with respect to the above description.

Example 1—A Portable Water Treatment System

Figure 1:
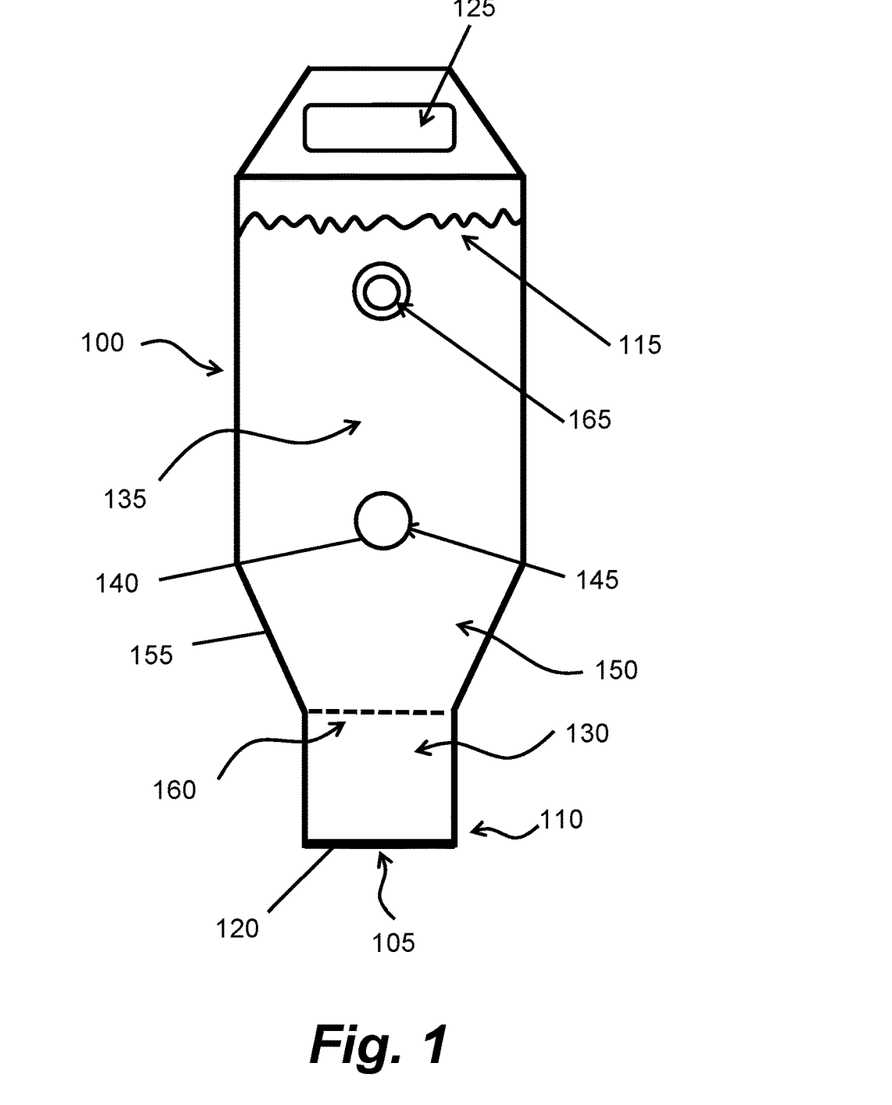
FIG. 1 shows a schematic representation of a container for treatment of water according to one embodiment of the present disclosure.

A schematic drawing of a container 100 for use in a water treatment system according to one embodiment is shown in FIG. 1. In the figure, the container 100 is shown in the upright position.

The container 100 is deformable in nature. Initially, the container 100 may be provided in a folded configuration to assist with storage and packaging. Once the container 100 has been unfolded, the container 100 is immersed in a water source for collection of water to be treated, and water enters the container through the opening 105, typically have a diameter of about 13 cm, in the base 110 of the container 100 until the container 100 is nearly full with water 115. In one embodiment, the container 110 can hold about 10 litres of water.

The container 100 is then removed from the water and held in an inverted position so as to prevent water leaking from the opening 105.

A chemical disinfectant and a flocculating agent are then added to the water 115 in the container through the opening 105, and the opening sealed using a locking slider 120. For example, a suitable disinfectant and flocculating agent is as provided commercially in a 4 gram sachet containing both calcium hypochlorite (disinfectant) and ferric sulfate (flocculant) from Procter & Gamble under the trade name "P&G Purifier of Water", suitable for the treatment of 10 litres of water. It is envisaged that the chemical disinfectant and flocculant will be included with the container as a product for sale.

The container 100 is then inverted multiple times to ensure thorough mixing of the water 115 to be treated in the container 100 with the chemical disinfectant and the flocculating agent.

The container 100 may then be hung in an upright position by the handle 125, or alternatively held by the handle 125. Over a period of time, typically for at least 30 minutes, the chemical disinfectant acts to treat the water to kill or inactivate microorganisms in the water, such as bacteria (for example coliform bacteria such as *E. coli* and *Salmonella*), protozoan parasites (for example *Giardia* and *Cryptosporidium*) and viruses (for example Norwalk and Rotavirus).

The flocculating agent acts to cause flocculation of material suspended in the water 115 and precipitate salts formed by the disinfectant when treating the water 115. The flocculant produced ("floc") settles under the action of gravity. Typically, the container 100 is made from a transparent plastic polymer, such as nylon or polyethylene, so as to allow visualisation of the settling of the floc and the consequent clarification of the water in the container.

Figure 2:
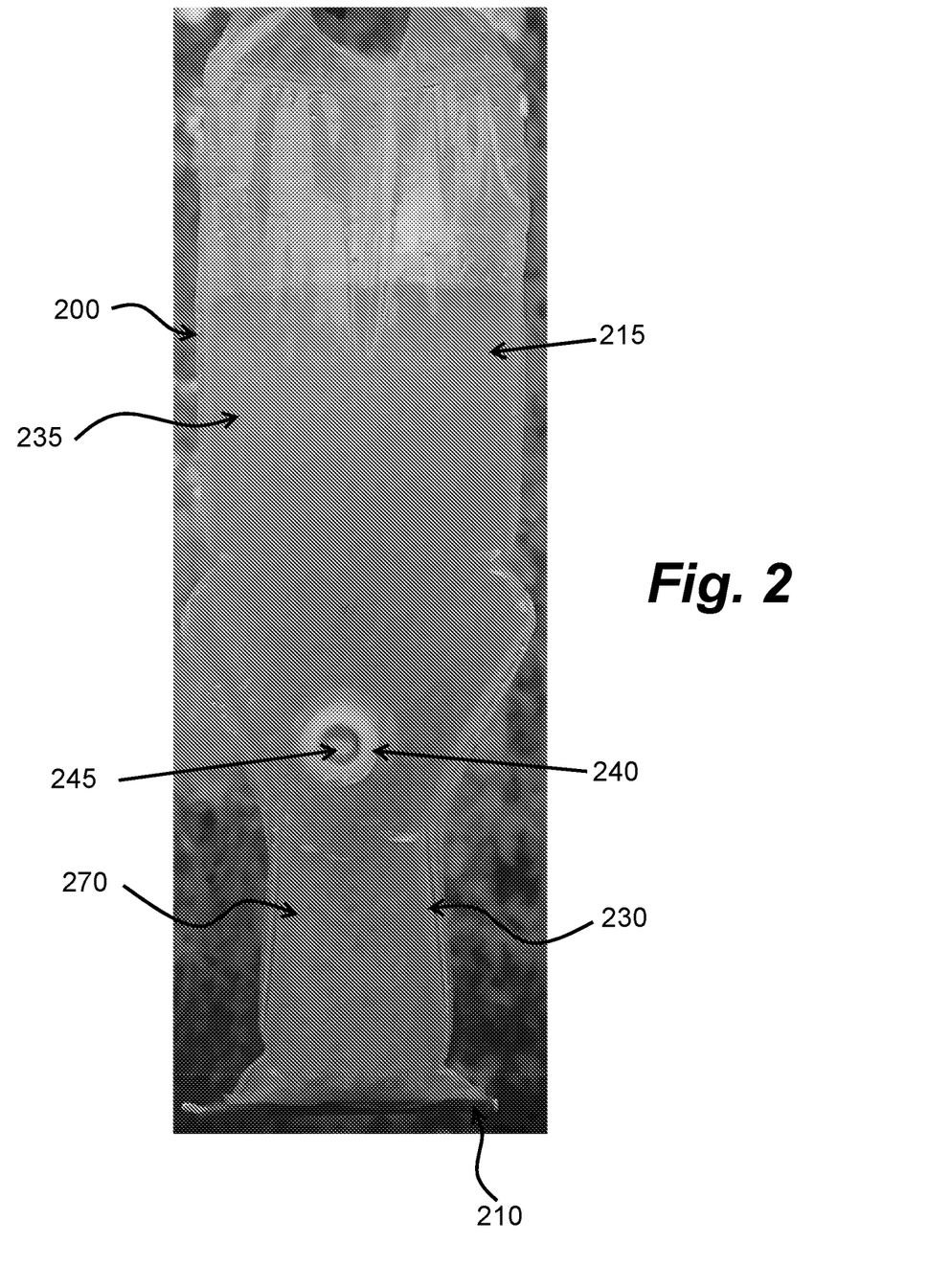
FIG. 2 shows a photograph of a deformable container for treating water from a water source according to one embodiment, in which untreated and yellow coloured water from the source of water has been placed in the container and treated with a chemical disinfectant and a flocculating agent, and flocculation is occurring. The water in the container is still discoloured, reflecting the yellow colour of the water from the water source. The container is sealed at the base of the container with a locking slider which has been applied to the opening after addition of the chemical disinfectant and flocculating agent.

The formation of the floc 270 in a container according to one embodiment is shown in FIG. 2 which is a photograph of water from a river being treated in the container 200, where flocculation can be seen to be occurring.

After a suitable period of time, the majority of the floc 270 settles in the base 210 of the container 200 in a partitionable region 230, that is partitionable from the main internal storage region 235 of the container, from where treated water may be obtained via an outlet 240, which is closable typically utilising an air-tight tap 245, or a self-shutting valve or a spigot.

Figure 3:
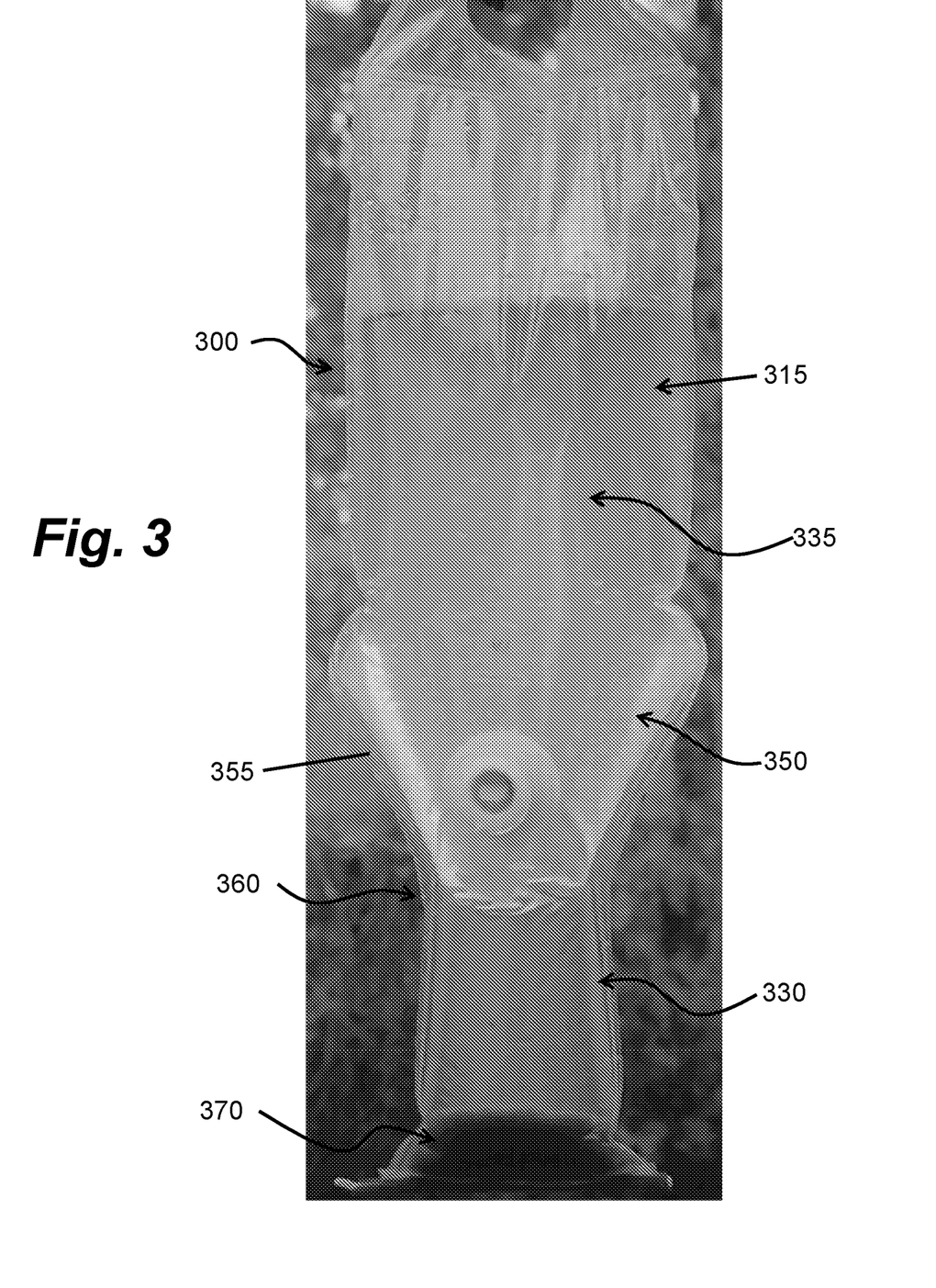
FIG. 3 shows a photograph of a deformable container for treating water according to one embodiment, in which water in the container has been treated with a chemical disinfectant and a flocculant, and the floc has settled in the container. The water in the container has been significantly clarified, and the yellow colour of the water significantly reduced, reflecting the oxidizing action of the chemical disinfectant and the flocculating properties of the flocculating agent on the water from the water source.

The settling of the floc in the container 300 according to one embodiment is shown in FIG. 3, where the floc 370 can be seen as the bottom of the partitionable region 330 and the water 315 has been substantially clarified.

The settling of the floc 370 in the container 300 is assisted by a tapering region 350 located above the partitionable region 330. The tapering region 350 connects the internal storage region 335 to the partitionable region 330, and provides a sloping surface wall 355 to reduce settling of the floc 370 on the walls 355 of the container 300 in the tapering region 350, and assists movement of the floc 370 under gravity to the base of the container 300.

Figure 4:
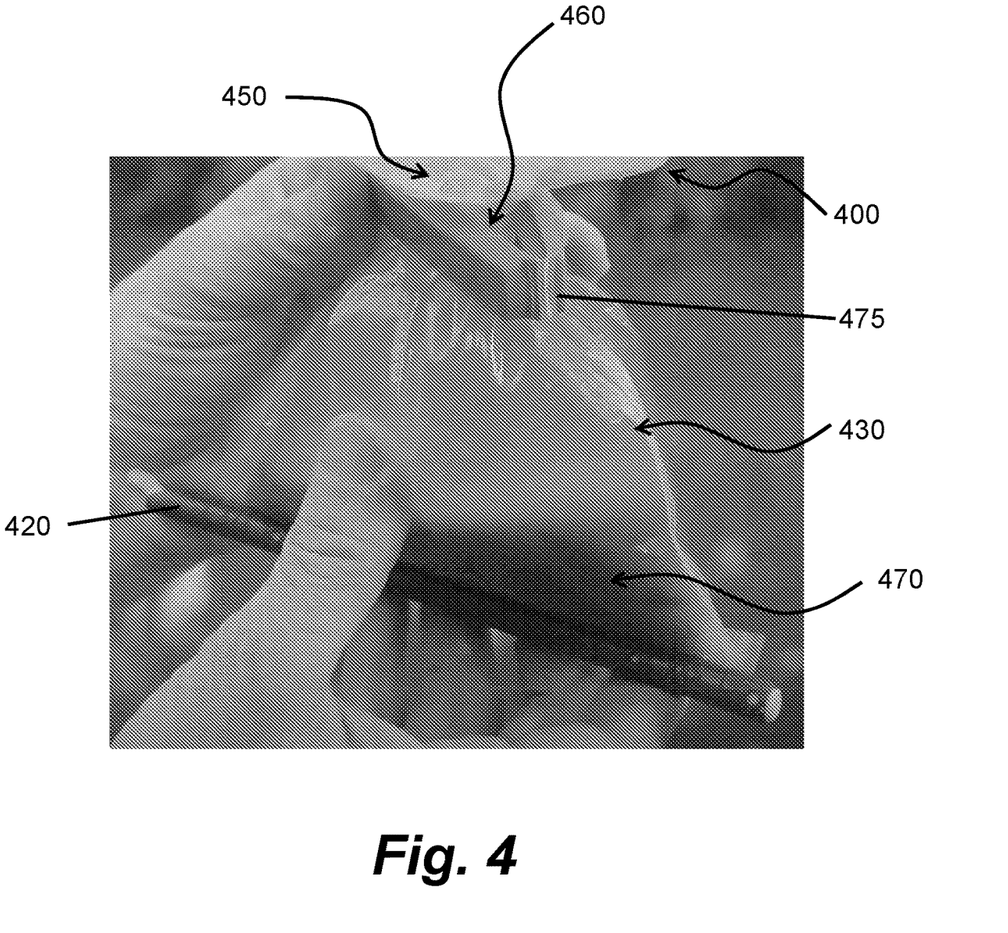
FIG. 4 shows a photograph of the lower section of a deformable water container for treating water according to one embodiment, in which the floc has settled in the partitionable region of the container, and the container has been manually twisted and clamped with a clamp to partition treated water in the partitionable region.

Once visual inspection has determined that substantially all the floc 370 has settled in the base of the container 300, and that there has been a consequent clarifying of the water 315 (as shown in FIG. 3), the plastic 350 in the region of the top of the partitionable region 360 is twisted so as to prevent water moving from the partitionable region 330 into the tapering region 350 and vice versa, as shown in FIG. 4.

Once the container 400 has been twisted to prevent fluid flow, a clamp 475 may be applied to the twisted area 460 to seal the partitionable region 430 from the tapering region 450 as shown in FIG. 4, which frees the hands to work on the container 400. At this point, the locking slider 420 is then released allowing the water and flocculant in the partitionable region 430 to be evacuated from the container 400. Manual manipulation of the partitionable region 430 assists with evacuating most of the water and flocculant 470 from the partitionable region 430.

Figure 5:
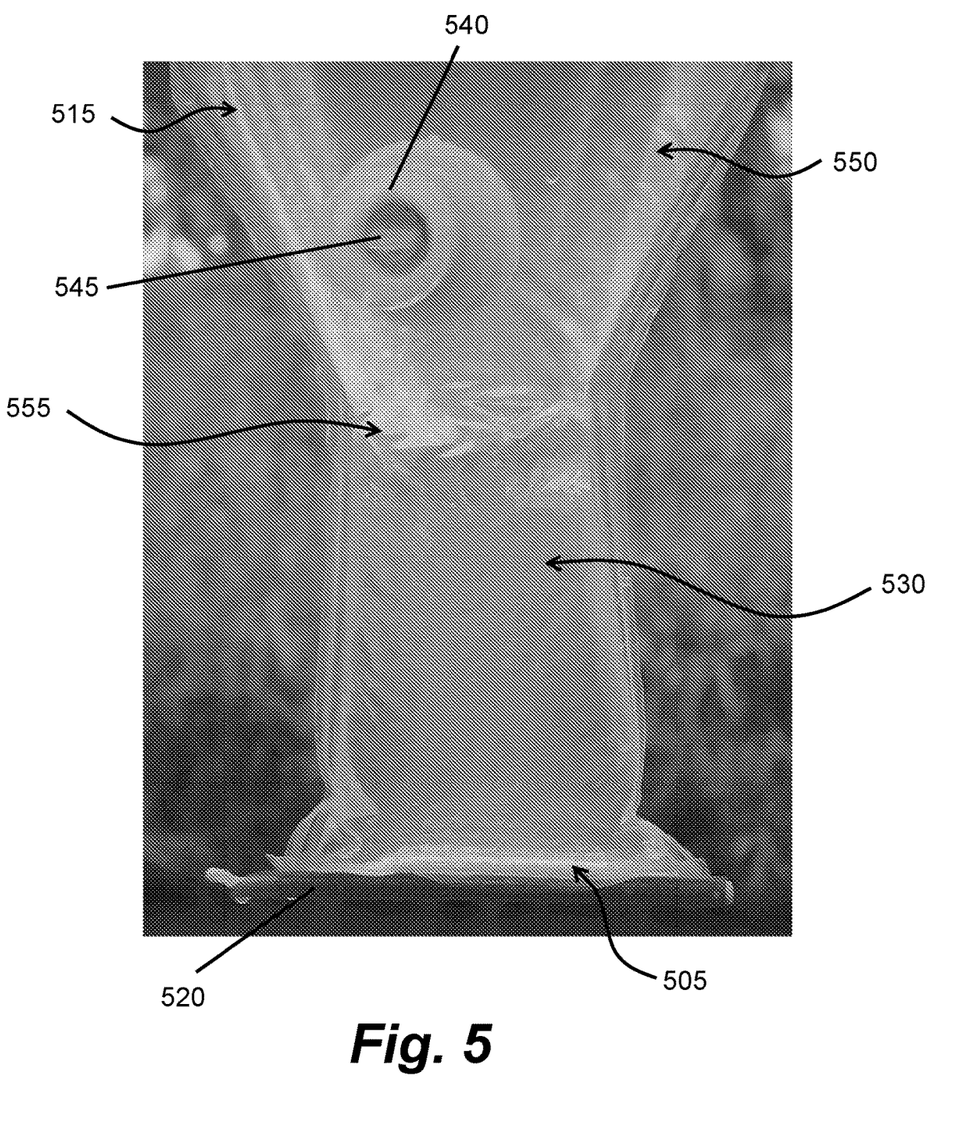
FIG. 5 shows a photograph of a lower section of deformable container for treating water according to one embodiment, in which the floc and water has been evacuated from the partitionable region, the locking slider re-applied to the bottom opening and the clamp released. In this photograph it can be seen that the water in the container has been substantially clarified of its original yellow colour.

Turning to FIG. 5, upon evacuation of water from the partitionable region 530, the closable opening 505 is then resealed with the locking slider 520 to prevent water loss, and the clamp released from the twisted area 555 to permit fluid connection between the partitionable region 530 and the tapering region 550, re-filling the partitionable region 530, as shown in FIG. 5.

At this point, the water 515 in the container has been chemically treated and clarified and is suitable for further use, such as drinking. The closable outlet 540 is located in the tapering region 550 and may then be used to provide treated water from the container by opening of the outlet 540 using the valve 545. The water obtained will typically be purified and at least partially clarified as compared to the original water source, but it will of course be appreciated that the clarification will depend in part upon the clarity of the initial water source used.

The closable outlet 540 may also include a size exclusion filter for filtering the water to prevent flow of particulates above a certain size and/or may also include an activated carbon filter (typically in line and after the size exclusion filter) to assist with removing chemical contaminants in the water and/or to improve the taste of the collected water.

Turning again to FIG. 1, the container 100 includes a partitionable region 130, having a top 160, and an internal storage region 135, with a tapering region 150 providing a sloping surface wall 155 therebetween. The container 100 may also contain one or more inlets or ports 165, typically positioned above the closable outlet 140 (in the form of an air-tight tap 145), to allow introduction of other agents into the container 100 before and/or after treatment. Such agents include, for example, one or more of specific chemical agents for further treating the water, flavourants, colourants, clarifiers, vitamins, minerals, therapeutic agents (such as antibiotics), and vaccines.

The treated water obtained using the system described above may be drunken directly from the container or be collected in a suitable container for drinking or further use, such as cooking, washing etc.

To re-use the container, the closable outlet 105 may be opened to permit evacuation of any remaining water in the container 100 and new water for treatment introduced into the container from the water source, typically after some rinsing of the inside of the container in the water source. The treatment of water in the container 100 may then carried out as described above.

The container 100 may also be prepared for storage between uses. Typically, once treated water is evacuated from the container, the container may be rinsed with water known to be suitable for drinking. The rinsing water may then be evacuated from the container 100 through the closable outlet 105 and the container 100 hung from the handle to permit draining of the rinsing water from the container 100. In addition, the closable opening 105 may be used to provide airing of the container 100, to allow drying of the container. Upon drying, the container 100 may then be folded to assist with storage.

Example 2—Water Treatment Products

A water treatment product for commercial availability would typically contain the following components:
(i) A container for treating water, for example as described in Example 1.
(ii) A means for locking the closable opening of the container, such as a locking slider as shown in FIGS. 1 to 5.
(iii) A clamp for clamping the container when twisted, for example as described in Example 1 and shown in FIG. 4.
(iv) A chemical disinfectant and a flocculant, for example as available in sachet form from Procter & Gamble under the trade name "P&G Purifier of Water".
(v) A size exclusion filter and/or carbon filter for placement behind the outlet.

It will be appreciated that in some embodiments, the water container may be available commercially separately, and the other components may be separately purchasable to support the use of a container previously purchased.

Although the present disclosure has been described with reference to particular embodiments, it will be appreciated that the disclosure may be embodied in many other forms. It will also be appreciated that the disclosure described herein is susceptible to variations and modifications other than those specifically described. It is to be understood that the disclosure includes all such variations and modifications. The disclosure also includes all of the steps, features, compositions and compounds referred to, or indicated in this specification, individually or collectively, and any and all combinations of any two or more of the steps or features.

Also, it is to be noted that, as used herein, the singular forms "a", "an" and "the" include plural aspects unless the context already dictates otherwise.

Throughout this specification, unless the context requires otherwise, the word "comprise", or variations such as "comprises" or "comprising", will be understood to imply the inclusion of a stated element or integer or group of elements or integers but not the exclusion of any other element or integer or group of elements or integers.

The term "about" or "approximately" means an acceptable error for a particular value, which depends in part on how the value is measured or determined. In certain embodiments, "about" can mean one or more standard deviations. When the antecedent term "about" is applied to a recited range or value it denotes an approximation within the deviation in the range or value known or expected in the art from the measurements method. For removal of doubt, it shall be understood that any range stated herein that does not specifically recite the term "about" before the range or before any value within the stated range inherently includes such term to encompass the approximation within the deviation noted above.

Reference to any prior art in this specification is not, and should not be taken as, an acknowledgment or any form of suggestion that this prior art forms part of the common general knowledge in any country.

The subject headings used herein are included only for the ease of reference of the reader and should not be used to limit the subject matter found throughout the disclosure or the claims. The subject headings should not be used in construing the scope of the claims or the claim limitations.

The description provided herein is in relation to several embodiments which may share common characteristics and features. It is to be understood that one or more features of one embodiment may be combinable with one or more features of the other embodiments. In addition, a single feature or combination of features of the embodiments may constitute additional embodiments.

All methods described herein can be performed in any suitable order unless indicated otherwise herein or clearly contradicted by context. The use of any and all examples, or exemplary language (e.g., "such as") provided herein, is intended merely to better illuminate the example embodiments and does not pose a limitation on the scope of the claimed invention unless otherwise claimed. No language in the specification should be construed as indicating any non-claimed element as essential.

Future patent applications may be filed on the basis of the present application, for example by claiming priority from the present application, by claiming a divisional status and/or by claiming a continuation status. It is to be understood that the following claims are provided by way of example only, and are not intended to limit the scope of what may be claimed in any such future application. Nor should the claims be considered to limit the understanding of (or exclude other understandings of) the present disclosure. Features may be added to or omitted from the example claims at a later date.

The invention claimed is:

1. A water treatment system, the water treatment system comprising:
(i) a chemical disinfectant and a flocculating agent, to treat water; and
(ii) a deformable container comprising:
an opening adapted to receive the chemical disinfectant, the flocculating agent and water for treatment into the container;

an internal storage region adapted to hold an amount of water;

a partitionable region having a top and a base;

a tapering region connecting the internal storage region to the top of the partitionable region;

the partitionable region configured to be: (i) fluidly connected with the internal storage region and tapering region when receiving treated water into the partitionable region, and (ii) fluidly partitioned at the top from the internal storage region by twisting, tying, clamping, or by use of a locking slider or seal, when separating settled flocculant resulting from exposure of the flocculating agent to water in the container;

an outlet in fluid connection with the internal storage region and the outlet is adapted to remove treated water from the container; and the opening is located at the base of the partitionable region and the opening is adapted to remove settled flocculant in the partitionable region when the partitionable region is fluidly partitioned from the internal storage region.

2. The water treatment system according to claim 1, wherein the opening comprises a locking slider or a seal.

3. The water treatment system according to claim 1, wherein the outlet is located above the tapering region.

4. The water treatment system according to claim 1, wherein the outlet comprises at least one of a size exclusion filter and an activated carbon filter.

5. The water treatment system according to claim 1, wherein the outlet comprises a tap or spigot.

6. The water treatment system according to claim 1, wherein the container comprises a handle to hang the container or hold the container in an upright position to allow settling of the flocculating agent in the partitionable region under the action of gravity.

7. The water treatment system according to claim 1, wherein the chemical disinfectant comprises a hypochlorite and the flocculating agent comprises a ferric salt.

8. A deformable water container for treatment of water, the water container comprising:

an opening adapted to receive water for treatment into the container;

an internal storage region adapted to hold an amount of water;

a tapering region connecting the internal storage region to the top of the partitionable region;

a partitionable region configured to be: (i) fluidly connected with the internal storage region and tapering region when receiving treated water into the partitionable region by twisting, tying, clamping, or by use of a locking slider or seal, when separating settled flocculant resulting from exposure of the flocculating agent to water in the container, and (ii) fluidly partitioned at the top from the internal storage region for separating settled flocculant resulting from exposure of a flocculating agent to water in the container; and an outlet in fluid connection with the internal storage region and the outlet is adapted to remove water from the container;

and the opening is located at the base of the partitionable region and the opening is adapted to remove settled flocculant in the partitionable region when the partitionable region is fluidly partitioned from the internal storage region.

9. The deformable water container according to claim 8, wherein the opening comprises a locking slider or seal.

10. The deformable water container according to claim 8, wherein the outlet is located above the tapering region.

11. The deformable water container according to claim 8, wherein the outlet comprises a size exclusion filter or an activated carbon filter.

12. The deformable water container according to claim 8, wherein the outlet comprises a tap or spigot.

13. The deformable water container according to claim 8, wherein the container comprises a means for hanging or holding the containing in an upright position to permit settling of the flocculating agent in the partitionable region under the action of gravity.

14. A method of treating water, the method comprising:

(1) collecting water for treatment in a deformable water container comprising:

an opening adapted to receive water for treatment into the container;

an internal storage region adapted to hold an amount of water;

a tapering region connecting the internal storage region to the top of the partitionable region;

a partitionable region configured to be: (i) fluidly connected with the internal storage region and tapering region when receiving treated water into the partitionable region, and (ii) fluidly partitioned from the internal storage region at the top from the internal storage region by twisting, tying, clamping, or by use of a locking slider or seal, when separating settled flocculant resulting from exposure of the flocculating agent to water in the container; and an outlet in fluid connection with the internal storage region to remove water from the container;

and the opening is located at the base of the partitionable region and the opening is adapted to remove settled flocculant in the partitionable region when the partitionable region is fluidly partitioned from the internal storage region (2) exposing the water in the container to a chemical disinfectant and a flocculating agent;

(3) allowing the flocculating agent to form a flocculant and settle in the partitionable region;

and separating the flocculant in the partitionable region from the water in the internal storage region;

thereby treating the water.

\* \* \* \* \*